(12) United States Patent
Gupta

(10) Patent No.: US 7,054,069 B1
(45) Date of Patent: May 30, 2006

(54) PROJECTION LENS AND IMAGE DISPLAY SYSTEM

(75) Inventor: Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/048,569

(22) Filed: Jan. 31, 2005

(51) Int. Cl.
*G02B 3/00* (2006.01)
*G02B 15/14* (2006.01)

(52) U.S. Cl. .................. 359/649; 359/680; 359/676

(58) Field of Classification Search ............... 359/676, 359/649, 680–683
See application file for complete search history.

(56) References Cited

U.S. PATENT DOCUMENTS

| | | | |
|---|---|---|---|
| 5,539,579 A * | 7/1996 | Miyatake et al. | 359/634 |
| 6,480,340 B1 * | 11/2002 | Yamamoto | 359/676 |
| 6,545,817 B1 * | 4/2003 | Hirose | 359/683 |
| 6,738,196 B1 * | 5/2004 | Yamamoto | 359/680 |
| 6,768,595 B1 * | 7/2004 | Nagahara | 359/683 |
| 6,809,877 B1 * | 10/2004 | Nagahara | 359/676 |

\* cited by examiner

*Primary Examiner*—Ricky Mack
*Assistant Examiner*—Mohammed Hasan

(57) ABSTRACT

A projection lens system is comprised of five lens groups. A first lens group forms a negative power lens group, and a second lens group forms a positive power lens group. Third, fourth, and fifth lens groups, when combined, form a positive power lens group, which helps to compensate for aberrations. At least one of the component lenses moves to adjust the system's focus. An image display system that includes such a projection lens system can project digital optical images for projection and other image display applications.

32 Claims, 4 Drawing Sheets

PROJECTION LENS AND IMAGE DISPLAY SYSTEM

BACKGROUND

Projectors and other image display systems based on digital light modulation techniques, such as digital micromirror devices (DMDs), use a lens system to project a pixelated object from the surface of a DMD-based display onto a projection screen. The surface of the digital light modulating display is typically located at or near an optical focal plane (hereinafter called an object plane) on an object side of the lens system. A projection screen is typically located on a projection side of the lens system. In this typical configuration, the lens system maps spatial points of light at the object plane to outgoing light rays at the projection side of the lens system. The outgoing rays impinge on a projection screen to display an image of a pixelated object located at the display surface of the digital light modulating device. The lens system is characterized by an overall focal length (FL), which, for reasons described below, is preferably short.

One disadvantage of conventional short FL lens systems is that the back focal length (BFL) is not large enough. Conventional lenses with a short FL have a short BFL. For a variety of applications, it would be useful to have a BFL that is large enough to place additional optical components in the light path between the object plane and the lens system. Simultaneously, it would be advantageous for a lens system to have a short FL to maintain a wide field of view and therefore a small throw ratio (projection distance/projected image width). In terms of a projection system, the throw ratio is proportional to the overall focal length FL of the projection lens system divided by the size of the object at the object plane. For a given object size, conventional lens systems do not provide a sufficiently large BFL while maintaining a short FL in order to provide: additional space for optical elements, a large field of view, and a small throw ratio.

Another disadvantage of conventional lens systems for projection applications is that they do not use spherical optics. Conventional lens systems often employ a number of aspherical lenses to correct various deleterious optical effects caused by light propagation through lens materials. These effects include spherical and chromatic aberration. The optical effects that are important for digital light modulating and other projection displays are associated with a number of optical measurements, such as low distortion, high telecentricity, low lateral color, and a high modulation transfer function (MTF). Digital light modulating display systems normally use a lens system comprised of aspherical lenses in order to satisfy the performance requirements for these optical measurements. Moreover, these conventional lens systems may use exotic lens materials. Lenses made from exotic materials, as well as aspherical lenses, are typically more expensive to develop and produce. It would be advantageous for a lens system to be able to employ less expensive spherical optics made of standard optical glasses or similar materials while satisfying strict performance requirements, providing sufficient correction for deleterious optical effects digital light modulation projection applications.

The present invention was developed in light of these and other drawbacks.

BRIEF DESCRIPTION OF THE DRAWINGS

The present invention will now be described, by way of example, with reference to the accompanying drawings, in which.

DETAILED DESCRIPTION OF AN EMBODIMENT

The present embodiments relate to a lens system configured to have a relatively large BFL while maintain a relatively short FL.

Figure 1:
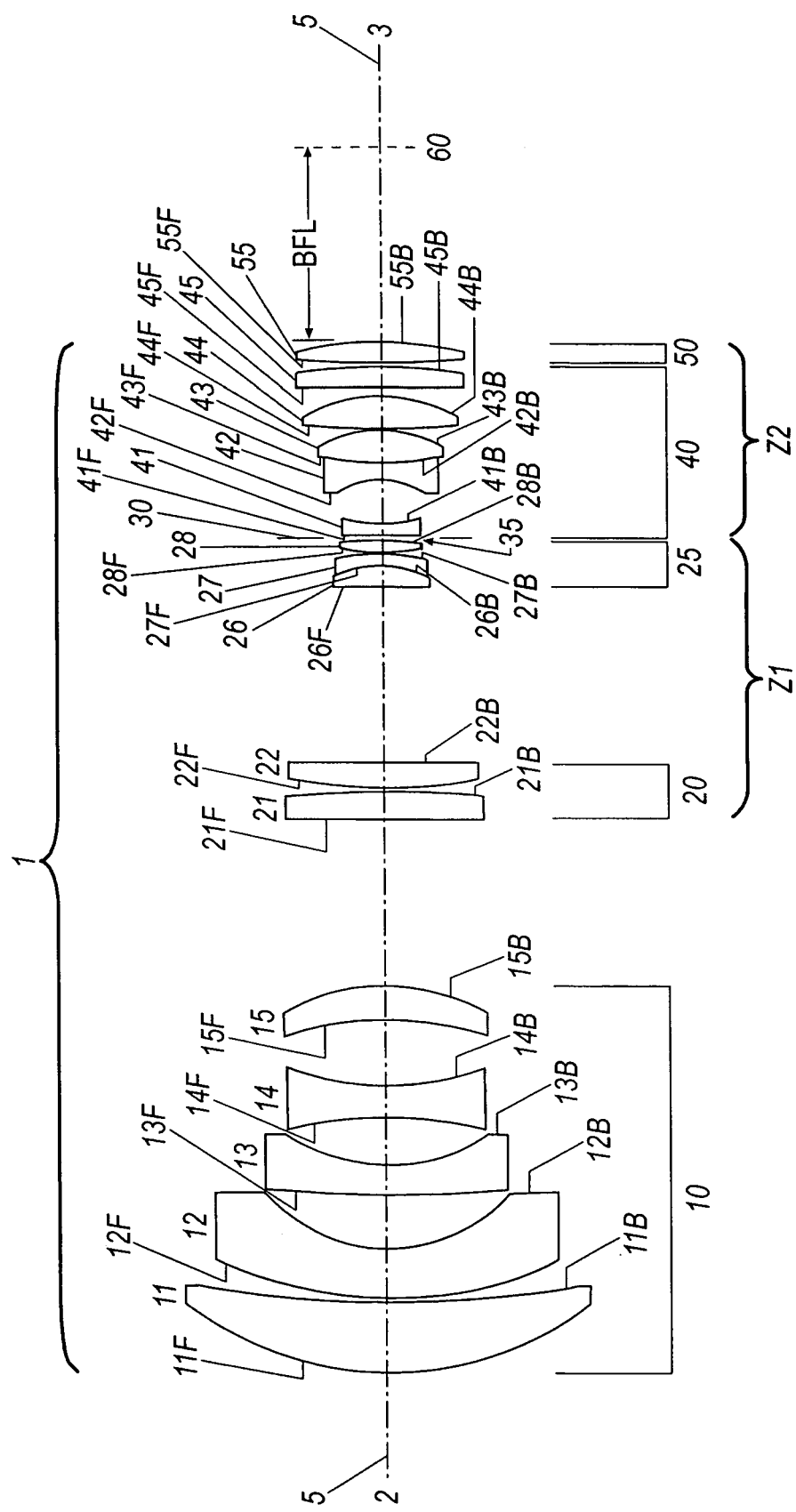
FIG. 1 shows a side view of a projection lens system according to a first exemplary embodiment.
Figure 1A:
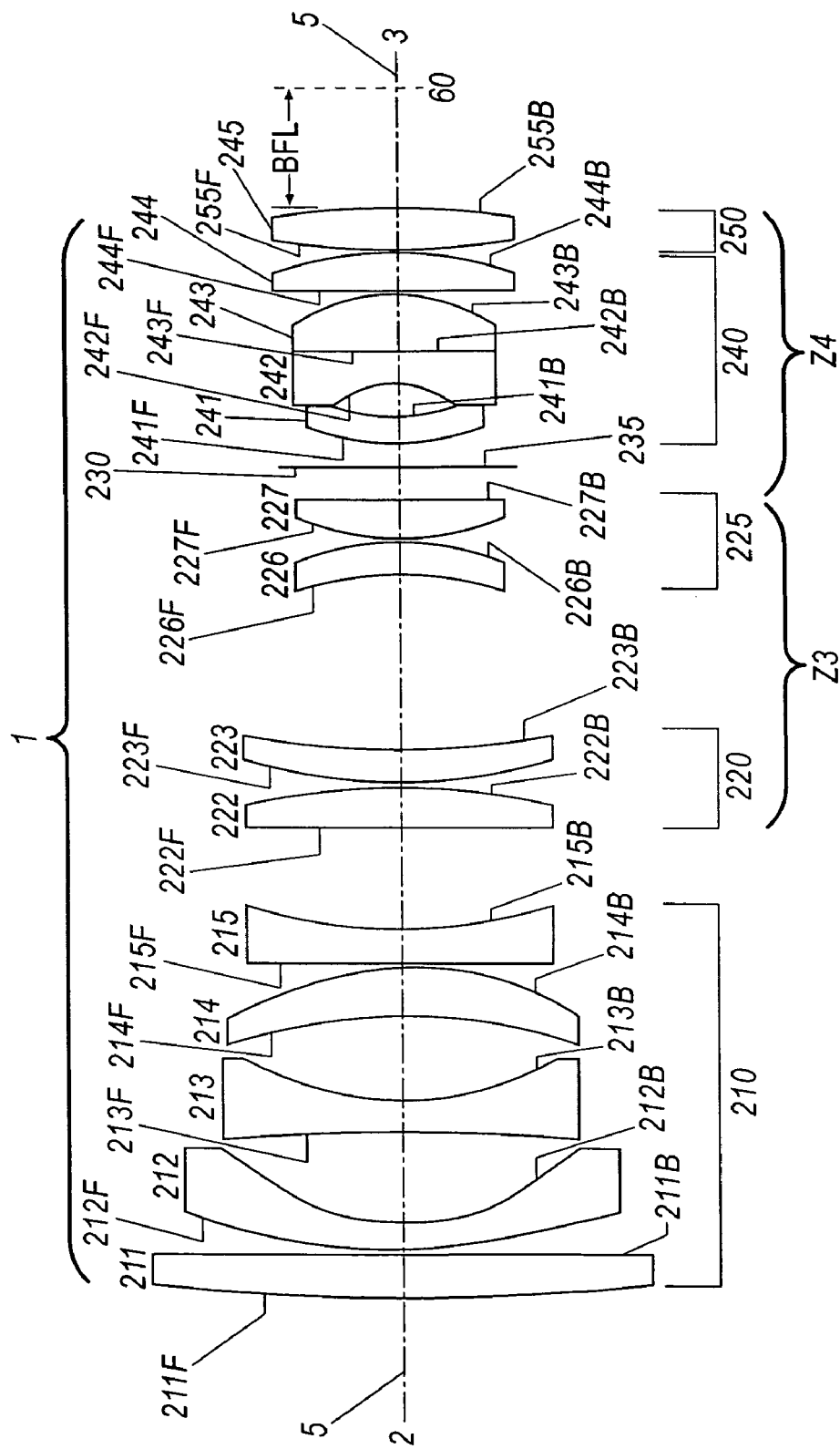
FIG. 1A shows a side view of a projection lens system according to a second exemplary embodiment.

Referring now to FIG. 1, a zoom projection lens system 1 has a projection side 2 and an object side 3. The lens system 1 generally projects an object from the optical object plane 60 on the object side 3 for display on the projection side 2. A first embodiment of the lens system 1 comprises five lens groups, which in order from the projection side 2 are a first lens group 10, a second lens group 20, a third lens group 25, a fourth lens group 40, and a fifth lens group 50. Referring now to FIG. 1A, a second embodiment of the lens system 1 comprises five lens groups, which in order from the projection side 2 are a first lens group 210, a second lens group 220, a third lens group 225, a fourth lens group 240, and a fifth lens group 250. Detailed data on the respective lenses that make up each lens group in a first exemplary embodiment and a second exemplary embodiment is given hereinafter. In each of FIGS. 1 and 1A, each lens is identified by a main reference number (e.g., 211) that identifies the lens itself and two sub reference numbers (e.g., 211F and 211B) that identify the front side and the back side of the lens, respectively.

Referring now to FIG. 1, in a first embodiment, to implement a lens with large BFL compared to the FL of the lens system 1, the first lens group 10 and the second lens group 20 together form a reverse telephoto-type lens. The first lens group 10 has negative refractive power while the second lens group 20 has a positive refractive power.

In a first exemplary embodiment, the first lens group 10 comprises the following five lenses. A positive meniscus lens 11 is positioned closest to the projection side 2 and has a convex surface 11$f$ on the projection side 2. A negative meniscus lens 12 is positioned on the object side 3 of lens 11 and has a convex surface 12$f$ on the projection side 2. Another negative meniscus lens 13 is positioned on the object side 3 of lens 12 and has a convex surface 13$f$ on the projection side 2. A double concave negative lens 14 has a concave surface 14$f$ on the projection side 2 and is positioned on the object side 3 of lens 13. A positive meniscus lens 15 is positioned on the object side 3 of lens 14 and has a concave surface 15$f$ on the projection side 2. The first lens group 10 functions as the projection-side lens of a reverse-telephoto lens system. To focus the object on the projection screen, the first four lenses from the projection side of the group 10 move with respect to the rest of the lens. In an exemplary embodiment, all of the lenses that comprise lens group 10 are spherical lenses.

In a first exemplary embodiment, the second lens group 20, positioned on the object side 3 of the first lens group 10, has a positive refractive power and comprises two positive lenses, lens 21 and lens 22. In a first exemplary embodiment, a plano-convex positive lens 21 is positioned closest to the projection side 2 and has a piano (flat) surface 21f on the projection side 2. A positive meniscus lens 22 is positioned on the object side 3 of lens 21 and has a convex surface 22f on the projection side 2. The second lens group 20 functions as the object-side lens of a reverse-telephoto lens system. In an exemplary embodiment, all of the lenses that comprise lens group 20 are spherical lenses.

In a first embodiment, the third lens group 25, the fourth lens group 40, and the fifth lens group 50 together have a positive refractive power and function in part as a compensator of various optical aberrations. The third lens group 25 is positioned on the object side 3 of the second lens group 20. In a first exemplary embodiment, the third lens group comprises the following three lenses. A positive meniscus lens 26 is positioned closest to the projection side 2 and has a concave surface 26f on the projection side 2. A negative meniscus lens 27 is positioned on the object side 3 of lens 26. Lens 27 has a concave surface 27f on the projection side 2 that has substantially the same curvature as a concave surface 26b on the object side 3 of lens 26. The lens pair 26 and 27 form a cemented doublet where the interface between the two is index matching cement. A positive convex lens 28 is positioned on the object side 3 of lens 27. In an exemplary embodiment, all of the lenses that comprise lens group 25 are spherical lenses.

The fourth lens group 40 is positioned on the object side 3 of the third lens group 25. In a first exemplary embodiment, the fourth lens group 40 comprises the following five lenses. A negative meniscus lens 41 is positioned closest to the projection side 2 and has a convex surface 41f on the projection side 2. A double concave negative lens 42 is positioned on the object side 3 of lens 41. A positive convex lens 43 is positioned on the object side 3 of lens 42. Lens 43 has a convex surface 43f on the projection side 2 that has substantially the same curvature as a concave surface 42b on the object side 3 of lens 42. The lens pair 42 and 43 form a cemented doublet where the interface between the two is index matching cement. A positive convex lens 44 is positioned on the object side 3 of lens 43. A piano-convex lens 45 is positioned on the object side 3 of lens 44 and has a piano (flat) surface 45f on the projection side 2. In an exemplary embodiment, all of the lenses that comprise lens group 40 are spherical lenses.

The fifth lens group 50 is positioned on the object side 3 of the fourth lens group 40 and is the lens group closest to the object plane 60. In a first exemplary embodiment, the fifth lens group 50 comprises a positive convex lens 55. In another exemplary embodiment, the fifth lens group 50 comprises a spherical positive convex lens 55. Any of the lenses that could be included in lens group 50 to form a positive lens group may be spherical.

In a first embodiment, the stop 30 for lens system 1 is positioned between the third lens group 25 and the fourth lens group 40. A stop forms an aperture that can define an effective entrance pupil diameter and can limit the field of view of the lens system. For example, a stop can limit the field of view that is visible for display in order to project only a desired object diameter from the object side to the projection side. The field of view of a projection lens system is characterized by the F/#, which is the ratio of the FL to the diameter of the entrance pupil. In an exemplary embodiment, the diameter of surface 28b that forms the object side 3 of lens 28 defines the stop size 35. That is, surface 28b or another lens surface may function as a stop 30 for the lens system 1. In another exemplary embodiment, a diaphragm forms stop 30. The diameter of the aperture of stop 30 then defines the stop size 35.

In a first embodiment, lens groups 20 and 25 constitute a group Z1 while lens groups 40 and 50 constitute group Z2. The relative movement of Z1 and Z2 brings about the bulk of focal length change for the entire lens during zooming. During this change, the position of the object plane may be fixed within a certain range by adequate compensation. In this embodiment, the object plane is fixed with respect to lens group 50. The compensation is achieved in a distributed manner. The airspaces between lens groups 40 and 50; between 10 and 20; and between lenses 14 and 15 vary in a non-linear fashion. The distribution of focal length across the various lens groups, in one embodiment, may be as follows: Lens Group 10: −62.8 mm; Lens Group 20: 102.7 mm; Zooming Group Z1: 52.4 mm; and Zooming Group Z2: 49.5 mm. The ratio of focal lengths of Z1 to Z2 in this embodiment is 1.06.

In an exemplary embodiment, in order to keep the F/# of the lens system constant without changing the stop size 35 during zooming, the stop 30 moves while remaining situated near the boundary between zoom group Z1 and zoom group Z2. Specifically, a constant F/# is maintained by positioning the stop 30 with stop size 35 such that the effective entrance pupil diameter scales with changes in FL during zooming. In another exemplary embodiment, the stop size 35 changes while the stop 30 remains in a fixed position to keep the F/# constant. For various exemplary embodiments, changing the diameter of stop 30 at a fixed zoom position adjusts the F/# and therefore the field of view.

Table 1 below lists the lens data for one zoom configuration of a first exemplary embodiment of the lens system 1 that uses standard Schott glasses and spherical lenses. A zoom configuration indicates the distance along the optical axis between exemplary optical elements. "S" represents the surface indicated in FIG. 1, "R" indicates the radius of curvature of surface "S", "T" represents the distance from surface "S" along the optical axis to the next surface in the direction of the object side 3, "G" represents the standard Schott glass material between surface "S" and the next surface in the direction of the object side 3, and "D" represents the diameter of surface "S". The indicated exemplary glass types may be replaced by equivalent glass types. All distances are in millimeters (mm). "G" is blank for air gaps. For this exemplary lens, the surface 28b forms the stop 30, and the diameter of surface 28b represents the stop size 35.

TABLE 1

| S | R | T | G | D |
|---|---|---|---|---|
| 11f | 77.9292 | 17 | N-SK2 | 100.3719 |
| 11b | 261.7451 | 1 | | 96.63879 |
| 12f | 87.19324 | 12 | N-BAK2 | 83.15533 |
| 12b | 38.92731 | 13.13521 | | 59.32806 |
| 13f | 463.1857 | 7 | N-LLF1 | 58.89572 |
| 13b | 44.84629 | 10.88126 | | 48.60089 |
| 14f | −88.05297 | 8 | N-FK5 | 48.42517 |
| 14b | 61.84627 | 15.91991 | | 46.13007 |
| 15f | −67.84419 | 8 | N-FK5 | 47.49525 |
| 15b | −45.98717 | 40.64358 | | 49.38275 |
| 21f | Infinity | 7 | N-F2 | 46.80022 |
| 21b | −170.0234 | 1 | | 46.62232 |
| 22f | 97.55913 | 6 | SF6 | 45.38831 |
| 22b | 403.0285 | 39.19208 | | 44.03758 |

TABLE 1-continued

| S | R | T | G | D |
|---|---|---|---|---|
| 26f | −150.5413 | 5.32 | N-FK5 | 23.05814 |
| 26b | −25.18061 | 0 | Index matching cement | 23.05814 |
| 27f | −25.18061 | 3 | N-SSK8 | 22.07553 |
| 27b | −47.42728 | 0.3 | | 21.24665 |
| 28f | 45.29572 | 3 | N-FK5 | 19.57286 |
| 28b | −116.2633 | 1 | | 18.67099 |
| 41f | 151.433 | 3 | N-F2 | 18.71884 |
| 41b | 30.75229 | 10.86639 | | 18.59636 |
| 42f | −19.33477 | 4.13 | SF6 | 20.88493 |
| 42b | 76.59732 | 0 | Index matching cement | 20.88493 |
| 43f | 76.59732 | 8.2 | N-FK5 | 27.22618 |
| 43b | −28.92318 | 0.3 | | 30.23207 |
| 44f | 251.3355 | 8 | K7 | 35.68948 |
| 44b | −37.01035 | 1.13545 | | 37.07734 |
| 45f | Infinity | 5 | SF10 | 38.95372 |
| 45b | −133.7586 | 1 | | 39.5665 |
| 55f | 257.5895 | 5 | SF14 | 39.82502 |
| 55b | −92.83876 | N/A | | 39.7752 |

For the first exemplary lens embodiment shown in Table 1, Table 2 shows standard lens characteristics found using a weighted distribution of optical rays with wavelengths centered at 546 nanometers (nm) and ranging from 460 nm to 620 nm. This first exemplary embodiment results in a BFL of 54.0 mm for an FL of 22.8 mm with a zoom ratio of ~1.22 and F/# of ~2.35 at the wide angle position, allowing projection of an object that is 21 mm in diameter near the object plane. As will be appreciated by those of skill in the art, unlike conventional projection lens systems, this lens embodiment provides a large BFL and a short throw while providing distortion less than 0.5%, telecentricity less than 1°, primary and secondary lateral color less than 6.5 microns between 460 nm and 620 nm, and polychromatic MTF greater than 30% up to 50 lp/mm over the entire field.

TABLE 2

| Lens Characteristic | Value |
|---|---|
| Effective Focal Length, minimum (FL) | 22.8 mm |
| Zoom Ratio | ~1.22 |
| Back Focal Length (BFL) | 54.0 mm |
| Range of distances to Projection Screen | 800 to 10000 mm |
| F/# at Wide Angel Zoom Position | ~2.35 |
| F/# Range at Telephoto Zoom Position | ~2.1–2.35 |
| Object Space Numerical Aperture (NA) | ~0.212 |
| Stop Radius | 9.335 mm |
| Paraxial Magnification | ~−.0234 |
| Entrance Pupil Diameter | ~9.930 mm |
| Angular Magnification | ~0.0481 |

Referring now to FIG. 1A, in a second embodiment, to implement a lens with large BFL compared to the FL of the lens system 1, the first lens group 210 and the second lens group 220 together form a reverse telephoto-type lens. The first lens group 210 has negative refractive power while the second lens group 220 has a positive refractive power.

In a second exemplary embodiment, the first lens group 210 comprises the following five lenses. A plano-convex lens 211 is positioned closest to the projection side 2 and has a convex surface 211f on the projection side 2. A negative meniscus lens 212 is positioned on the object side 3 of lens 211 and has a convex surface 212f on the projection side 2. A double concave negative lens 213 is positioned on the object side 3 of lens 212. A positive meniscus lens 214 is positioned on the object side 3 of lens 213 and has a concave surface 214f on the projection side 2. A piano-concave lens 215 is positioned on the object side 3 of lens 214 and has a piano (flat) surface 215f on the projection side 2. The first lens group 210 functions as the projection-side lens of a reverse-telephoto lens system. During focusing, to focus the object on the projection screen, the first three lenses from the projection side of the group 210 move with respect to the rest of the lens. In an exemplary embodiment, all of the lenses that comprise lens group 210 are spherical lenses.

In a second exemplary embodiment, the second lens group 220, positioned on the object side 3 of the first lens group 210, has a positive refractive power and comprises two lenses. A plano-convex lens 222 is positioned closest to the projection side 2 and has a piano (flat) surface 221f on the projection side 2. A positive meniscus lens 223 is positioned on the object side 3 of lens 222 and has a convex surface 223f on the projection side 2. The second lens group 220 functions as the object-side lens of a reverse-telephoto lens system. In an exemplary embodiment, all of the lenses that comprise lens group 220 are spherical lenses.

In a second embodiment, the third lens group 225, the fourth lens group 240, and the fifth lens group 250 together have a positive refractive power and function in part as a compensator of various optical aberrations. The third lens group 225 is positioned on the object side 3 of the second lens group 220. In a second exemplary embodiment, the third lens group comprises the following two lenses. A positive meniscus lens 226 is positioned closest to the projection side 2 and has a concave surface 226f on the projection side 2. A piano-convex lens 227 is positioned on the object side 3 of lens 226 and has a convex surface 227f on the projection side 2. In an exemplary embodiment, all of the lenses that comprise lens group 225 are spherical lenses.

The fourth lens group 240 is positioned on the object side 3 of the third lens group 225. In a second exemplary embodiment, the fourth lens group 240 comprises the following four lenses. A negative meniscus lens 241 is positioned closest to the projection side 2 and has a convex surface 241f on the projection side 2. A double concave negative lens 242 is positioned on the object side 3 of lens 241. A positive convex lens 243 is positioned on the object side 3 of lens 242. Lens 243 has a convex surface 243f on the projection side 2 that has substantially the same curvature as a concave surface 242b on the object side 3 of lens 242. The lens pair 242 and 243 form a cemented doublet where the interface between the two is index matching cement. A plano-convex lens 244 is positioned on the object side 3 of lens 243 and has a piano (flat) surface 244f on the projection side 2. In an exemplary embodiment, all of the lenses that comprise lens group 240 are spherical lenses.

The fifth lens group 250 is positioned on the object side 3 of the fourth lens group 240 and is the lens group closest to the object plane 260. In a second exemplary embodiment, the fifth lens group 250 comprises a positive convex lens 255. In another exemplary embodiment, the fifth lens group 250 comprises a spherical positive convex lens 255. Any of the lenses that could be included in lens group 250 to form a positive lens group may be spherical.

In a second embodiment, the stop 230 for lens system 1 is positioned between the third lens group 225 and the fourth lens group 240. In a second exemplary embodiment, a diaphragm forms the stop 230, and the diameter of the diaphragm's aperture defines the stop size 235. In an exemplary embodiment, the diaphragm's aperture 235 has a diameter smaller than the diameters of lenses 227 and 224.

In a second embodiment, lens groups 220 and 225 constitute a group Z3 while lens groups 240 and 250 constitute group Z4. The relative movement of Z3 and Z4 brings about the bulk of focal length change for the entire lens during zooming. During this change, the position of the object plane should be fixed within a certain range by adequate compensation. In this embodiment, the object plane is maintained at a distance from lens group 250 greater than the back focal distance at all zoom positions. The compensation is achieved in a distributed manner. The airspaces after lens group 250; between lenses 213 and 214; and between lenses 214 and 215 vary in a non-linear fashion. In one embodiment, the distribution of focal length across the various lens groups is as follows: Lens Group 210: −38.1 mm; Lens Group 220: 85.4 mm; Zooming Group Z3: 57.2 mm; and Zooming Group Z4: 51.2 mm. In this embodiment, the ratio of focal lengths of Z1 to Z2 is 1.11.

In an exemplary embodiment, in order to keep the F/# of the lens system constant without changing the stop size 235 during zooming, the stop 230 moves location while remaining situated near the boundary between zoom group Z3 and zoom group Z4. Specifically, a constant F/# is maintained by positioning the stop 230 with stop size 235 such that the effective entrance pupil diameter scales with changes in FL during zooming. In another exemplary embodiment, the stop size 235 changes while the stop 230 remains in a fixed position to keep the F/# constant. For various exemplary embodiments, changing the diameter of stop 230 at a fixed zoom position adjusts the F/# and therefore the field of view.

Table 3 below lists the lens data for one zoom configuration of a second exemplary embodiment of the lens system 1 that uses standard Schott glasses and spherical lenses. A zoom configuration indicates the distance along the optical axis between exemplary optical elements. "S" represents the surface indicated in FIG. 1A, "R" indicates the radius of curvature of surface "S", "T" represents the distance from surface "S" along the optical axis to the next surface in the direction of the object side 3, "G" represents the standard Schott glass material between surface "S" and the next surface in the direction of the object side 3, and "D" represents the diameter of surface "S". The indicated exemplary glass types may be replaced by equivalent glass types. All distances are in millimeters (mm). "G" is blank for air gaps. For this exemplary lens, a diaphragm forms stop 230, and the diameter of the aperture in stop 230 defines the stop size 235.

TABLE 3

| S | R | T | G | D |
|---|---|---|---|---|
| 211f | 387.565 | 8 | SF4 | 92 |
| 211b | Infinity | 1 | | 92 |
| 212f | 127.008 | 5 | BK7 | 80 |
| 212b | 49.046 | 17 | | 66 |
| 213f | −245.05 | 5 | BK7 | 66 |
| 213b | 61.215 | 30.362 | | 60 |
| 214f | −94.94 | 9 | BK7 | 60 |
| 214b | −61.215 | 37.84 | | 64 |
| 221f | Infinity | 5 | SF4 | 56 |
| 221b | 94.94 | 4.6 | | 52 |
| 222f | Infinity | 8 | SF4 | 56 |
| 222b | −94.94 | 1 | | 56 |
| 223f | 86.94 | 6 | SF4 | 56 |
| 223b | 142.219 | 41.24 | | 52 |
| 226f | −52.112 | 6 | BK7 | 34 |
| 226b | −42.17 | 1 | | 38 |
| 227f | 42.17 | 8 | BK7 | 38 |
| 227b | Infinity | 2 | | 38 |
| 230 | Infinity | 5.1 | (Stop) | 20.6 |
| 241f | 42.17 | 4 | SF4 | 32 |
| 241b | 24.731 | 8 | | 25.4508 |
| 242f | −20.332 | 4 | SF4 | 25.4508 |
| 242b | 127.008 | 0 | Index matching cement | 37 |
| 243f | 127.008 | 11 | BK7 | 37 |
| 243b | −29.955 | 1 | | 37 |
| 244f | Infinity | 7.1 | S-LAM59 | 40 |
| 244b | −54.003 | 1 | | 44 |
| 255f | 98.09 | 7.8 | S-LAM59 | 44 |
| 255b | −98.09 | N/A | | 44 |

For the second exemplary lens embodiment shown in Table 3, standard lens characteristics were found using a weighted distribution of optical rays with wavelengths centered at 546 nanometers (nm) and ranging from 460 nm to 620 nm. This second lens embodiment results in a BFL of 54.0 mm for an FL of ~23 mm with a zoom ratio of ~1.2 and F/# of ~2.3, allowing projection of an object that is 21 mm in diameter near the object plane. As will be appreciated by those of skill in the art, unlike conventional projection lens systems, this lens embodiment provides a large BFL and a short throw using only three standard optical glasses while providing distortion less than 1%, telecentricity less than 1°, primary lateral color less than 7 microns between 460 nm and 620 nm, and polychromatic MTF greater than 30% up to 50 lp/mm over the entire field.

While one advantage over the prior art of the lens embodiments disclosed above is the use of spherical refractive lenses made of standard optical glasses to create a large BFL-lens system, variations will be apparent to those skilled in the art. Specifically, an aspherical lens can replace any of the spherical lenses of any of the lens groups disclosed in the embodiments above. In addition, optical materials other than standard glasses, such as standard plastics and non-standard glasses and plastics, may be used to form replacements for the lens embodiments. Furthermore, diffractive lenses or partially refractive and partially diffractive lenses may form any part of a lens group, depending on the desired characteristics of the projected image. Such replacements can be geared toward specific applications. For example, an aspherical lens with a non-standard glass can correct remnant optical aberrations or can allow component lenses within the lens groups to be combined to reduce the number of elements in an embodiment of the lens system. Moreover, one of skill in the art will appreciate that various configurations of a front lens group having negative lens power during zooming can assist in correcting aberrations uncorrected by the zoom groups.

An image-display system (or projection system) can be configured using an embodiment of the lens system disclosed herein. For an image-display system, it is desirable to place additional devices between the optical object plane and the lens system. Specifically, those of skill in the art will appreciate that these additional devices, among other functions, can steer light or can modify the properties of the light that propagates from the object plane to the lens system. In a preferred embodiment, any optical elements placed in the optical path between the lens system and the object plane do not significantly alter the optical properties of the lens system, such as FL, BFL, field of view, distortion, telecentricity, lateral color, and MTF.

Figure 2:
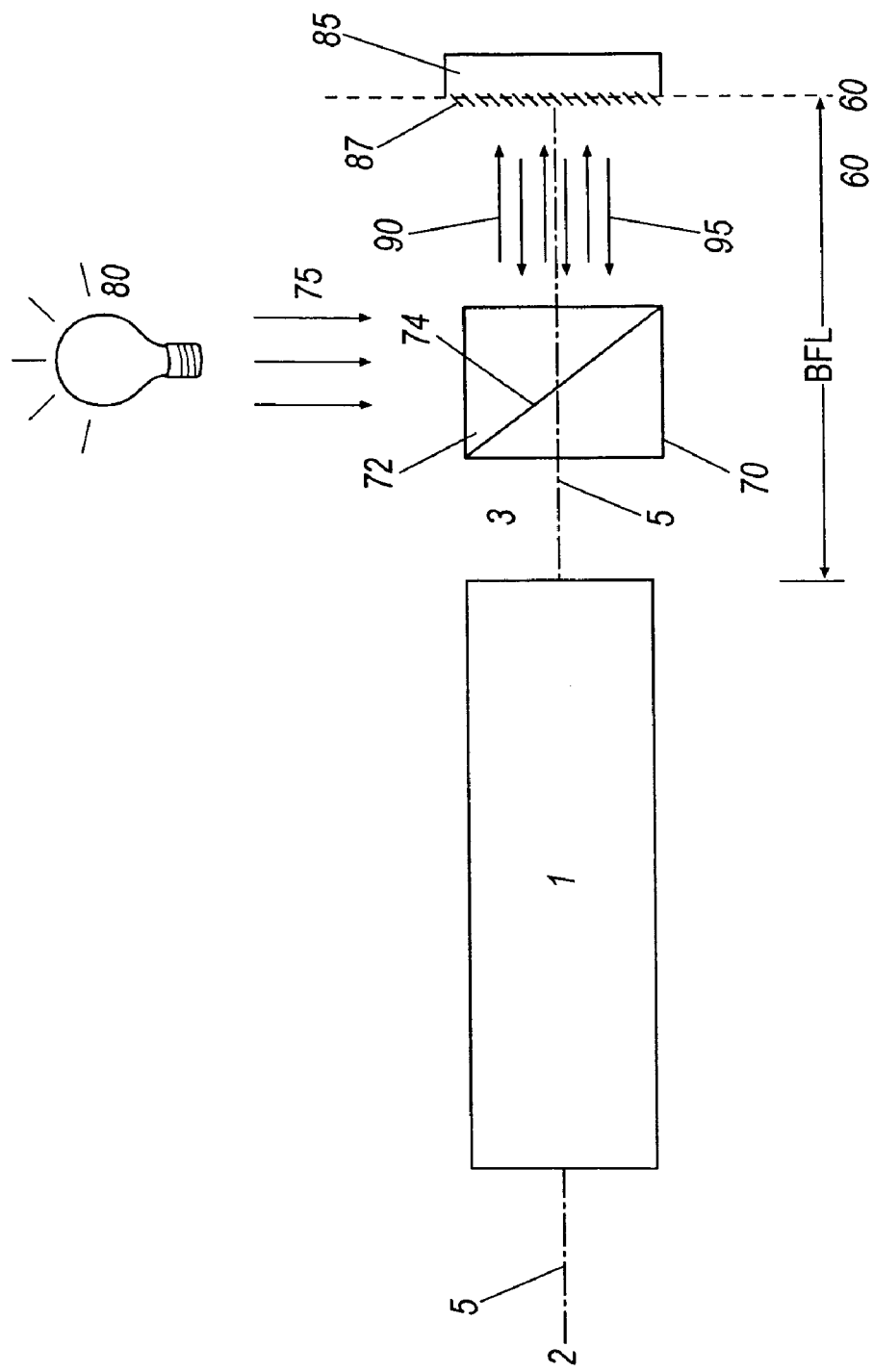
FIG. 2 shows a schematic view of a projection system embodiment that uses a projection lens system.

Now referring to FIG. 2, an embodiment of an image display system uses a lens system 1 with a large BFL. The large BFL allows placement of additional elements between the object plane 60 of the lens system 1 and the lens system 1 itself. One embodiment of a projection system employs a partially reflecting-partially transmitting optical element (PRT) 70 having a polarizing or dichroic beam splitter 74, as is known in the art. PRT 70 is illuminated by illumination light 75 from an illumination source 80. The PRT 70, placed between the lens system 1 and its optical object plane 60, reflects illuminating light 75. After reflection, the illuminating light 90 then travels parallel to the lens system axis 5 but away from the lens system 1 and toward the optical object plane 60. The light 90 may reflect from an optical modulator, or from another reflective and/or transmitting optical object-producing device (OPD) 85. For example, the OPD 85 may be an array of DMD reflectors or other digital light-directing devices. The optical object plane 60 and the axis of the lens system 5 define the location and placement of a reflecting and/or transmitting surface 87 of the OPD 85. In an exemplary embodiment, the OPD surface 87 is placed parallel to the optical object plane 60 of the lens system with the lens system's optical axis 5 intersecting the centroid of the OPD. Light 95 travels from the OPD 85 toward the lens system 1 for display at the projection side 2 of the lens system.

In an exemplary embodiment, a prism may constitute the PRT 70 of FIG. 2. For example, a prism 70 may have a partially reflecting-partially transmitting surface 74, such as a polarizing or dichroic beam splitter, at an angle 72 to the lens system's optical axis 5 that allows simultaneous illumination of an OPD surface 87 and propagation of light 95 reflected or transmitted from the OPD surface 87 to the lens system 1 along optical axis 5. A prism 70 may reflect illumination light 75 propagating from an illumination source 80. For example, illumination light 75 that propagates substantially normal to the lens system's optical axis 5 toward a prism surface 74 at an exemplary 45-degree angle 72 partially reflects from that surface. The reflected light 90 then travels along the lens system axis 5 but in a direction away from the lens system 1, illuminating the OPD 85. The OPD 85 may imprint an optical object on the light 90, sending that object as light rays 95 that travel toward the lens system 1. Alternatively, the OPD 85 may produce its own light 95. Light rays 95 impinge on prism 70, which partially transmits the light rays 95 toward the lens system 1 along optical axis 5. If the prism 70 transmits an optical object imprinted on the light rays 95 towards the lens system 1, the lens system 1 projects that object for display at the projection side 2 of the lens system.

Figure 3:
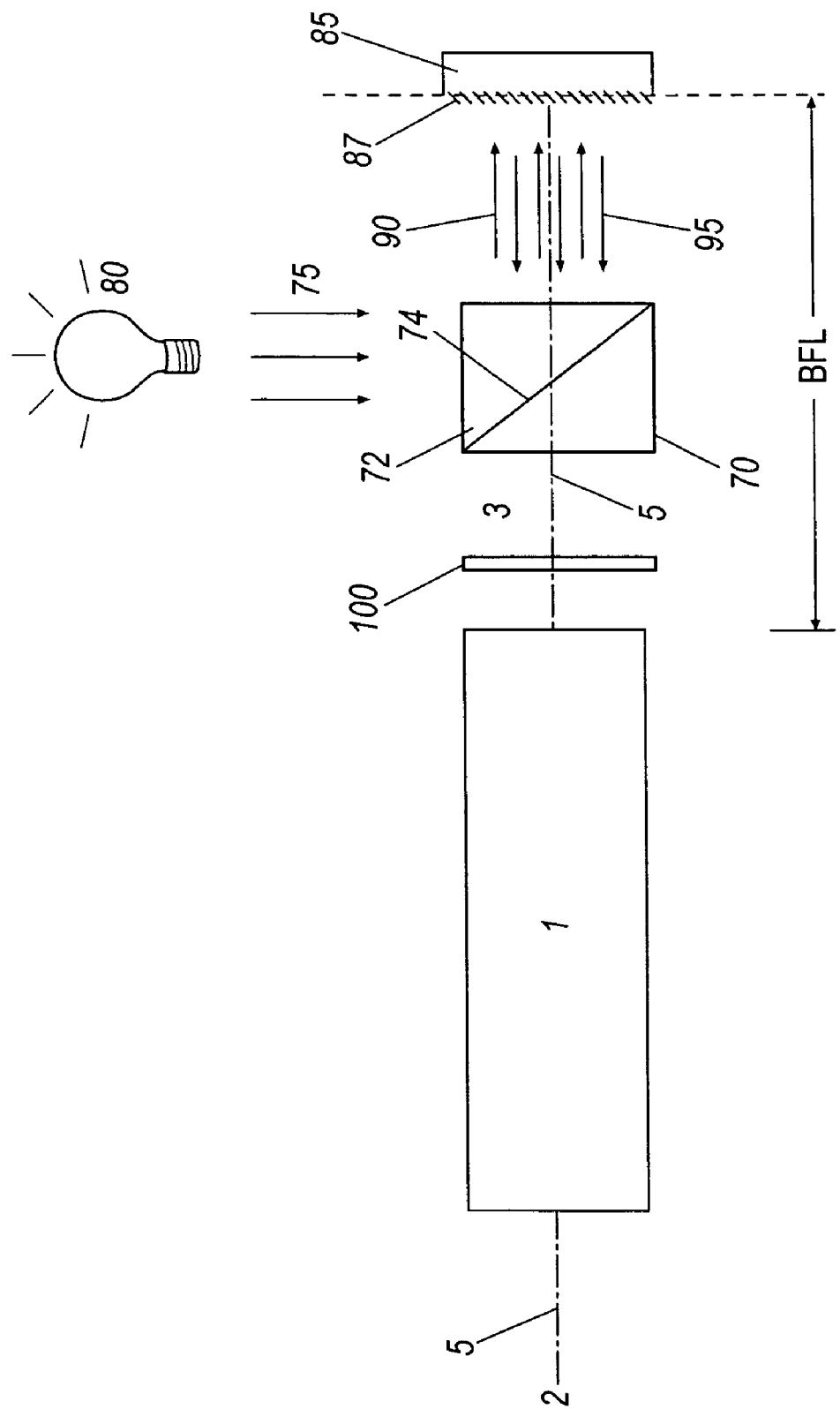
FIG. 3 shows a schematic view of a projection system embodiment, including a wobulator, that uses a projection lens system.

FIG. 3 illustrates a variation of the image display system of FIG. 2. In addition to the components included in FIG. 2 (and described above), FIG. 3 shows an image display system that also incorporates a wobulator 100. The wobulator 100 is an additional optical projection component that can be used in some optical image display systems to improve the quality of the projected image by rapidly and repeatedly offsetting the physical positioning of the pixels, as described in commonly-assigned published U.S. Published Application No. 20040028293, hereby incorporated by reference in their entireties.

While the present invention has been particularly shown and described with reference to the foregoing embodiments, it should be understood by those skilled in the art that various alternatives to the embodiments of the invention described herein may be employed in practicing the invention without departing from the spirit and scope of the invention as defined in the following claims. By way of example, the claimed lens system is described as possibly being used in connection with a DMD-based projection system, but a person skilled in the art will recognize that the claimed lens system can be used in a variety of environments, including in connection with Lcos, LCD and other types of digital spacial light modulators. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

The invention claimed is:

1. A projection lens system with a projection side and an object side comprising:
   a first lens group positioned adjacent to the projection side, having negative power;
   a second lens group positioned on the object side of said first lens group and having positive power;
   a third, a fourth, and a fifth lens group positioned sequentially on the object side of the second lens group, having a combined positive power, and being configured to compensate for aberrations;
   said second and third lens groups defining a combined zooming lens group configured to move to create a zooming effect; and
   at least one of said lens groups including at least one lens configured to move to adjust a focus, and wherein at least one of said lens groups includes a spherical lens.

2. A projection lens system according to claim 1, wherein said first lens group includes said at least one lens configured to move to adjust a focus.

3. A projection lens system according to claim 1, wherein said fifth lens group has positive power.

4. A projection lens system according to claim 1, wherein each of the lens groups includes a spherical lens.

5. A projection lens system according to claim 1, wherein said second and third lens groups are configured to move toward the projector side to increase the focal length during zooming.

6. A projection lens system according to claim 5, wherein said fourth lens group is configured to move during zooming to compensate for aberrations caused by moving said second and third lens groups.

7. A projection lens system according to claim 1, further comprising a stop positioned substantially between the third and fourth lens groups, said stop configured to move during zooming in order to maintain a substantially constant F/#.

8. A projection lens system according to claim 1, wherein said first lens group comprises, sequentially from the projection side, a first positive refractive lens that is convex on the projection side, a first negative refractive lens that is convex on the projection side, a second negative refractive lens that is convex on the projection side, a double concave negative refractive lens, and a second positive refractive lens that is concave on the projection side.

9. A projection lens system according to claim 1, wherein said first lens group comprises, sequentially from the projection side, a piano-convex lens that is convex on one side, a first negative refractive lens that is convex on the projection side, a second negative refractive lens that is convex on the projection side, a positive refractive lens that is concave on the projection side, and a piano-concave lens that is flat on the projection side.

10. A projection lens system according to claim 1, wherein said second lens group comprises, sequentially from the projection side, a piano-convex refractive lens that is flat on the projection side and a positive refractive lens that is convex on the projection side.

11. A projection lens system according to claim 1, wherein said second lens group comprises, sequentially from the projection side, a piano-convex lens that is flat on the projection side, and a positive meniscus lens that is convex on the projection side.

12. A projection lens system according to claim 1, wherein said third lens group comprises, sequentially from the projection side, a first positive refractive lens that is concave on the projection side, a negative refractive lens that has a concave surface on the projection side, and a second positive refractive lens that is convex on the projection side.

13. A projection lens system according to claim 12, wherein said first positive refractive lens forms a cemented doublet with the said negative refractive lens.

14. A projection lens system according to claim 13, wherein said second positive lens is configured to define a stop for the lens system.

15. A projection lens system according to claim 1, wherein said third lens group comprises, sequentially from the projection side, a positive meniscus lens that is concave on the projection side, and a piano convex lens that is convex on the projection side.

16. A projection lens system according to claim 1, wherein said fourth lens group comprises, sequentially from the projection side, a negative refractive lens that is convex on the projection side, a double concave negative refractive lens, a first positive refractive lens that has a convex surface on the projection side, a second positive refractive lens that is convex on the projection side, and a plano-convex lens that is flat on the projection side.

17. A projection lens system according to claim 16, wherein said double concave lens forms a cemented doublet with the positive refractive lens.

18. A projection lens system according to claim 1, wherein said fourth lens group comprises, sequentially from the projection side, a negative meniscus lens that is convex on the projection side, a double concave negative lens, a positive convex lens that is convex on the projection side, and a piano convex lens that is flat on the projection side.

19. A projection lens system according to claim 1, wherein said fifth lens group comprises a positive convex refractive lens.

20. A projection lens system with a projection side and an object side comprising:
  a first lens group positioned adjacent to the projection side, comprising, sequentially from the projection side, a first positive refractive lens that is convex on the projection side, a first negative refractive lens that is convex on the projection side, a second negative refractive lens that is convex on the projection side, a double concave negative refractive lens, and a second positive refractive lens that is concave on the projection side; and
  a second lens group positioned on the object side of said first lens group, comprising, sequentially from the projection side, a first positive refractive lens and a second positive refractive lens, said second positive lens being convex on the projection side.

21. A projection lens system according to claim 20, wherein at least one of said lenses configured to move to adjust a focus.

22. A projection lens system according to claim 20, further comprising an aberration-compensating lens group positioned on the object side of said second lens group, having positive power, including at least one positive lens, and being configured to compensate for aberrations.

23. A projection lens system according to claim 20, wherein each of said lens groups includes a spherical lens.

24. A projection lens system according to claim 20, further comprising:
  a third lens group positioned on the object side of the second lens group and comprising, sequentially from the projection side, a first positive refractive lens that is concave on the projection side, a negative refractive lens that has a concave surface on the projection side, and a second positive refractive lens that is convex on the projection side;
  a fourth lens group positioned on the object side of the third lens group and comprising, sequentially from the projection side, a negative refractive lens that is convex on the projection side, a double concave negative refractive lens, a first positive refractive lens that has a convex surface on the projection side, a second positive refractive lens that is convex on the projection side, and a positive convex refractive lens; and
  a fifth lens group positioned on the object side of the fourth lens group and comprising a positive convex refractive lens.

25. A projection lens system according to claim 24, wherein at least one of said lenses is configured to move to adjust a focus.

26. A projection lens system according to claim 24, wherein each of said lens groups includes a spherical lens.

27. A projection lens system according to claim 24, wherein:
  said second and third lens groups are configured to move toward the projector side to increase the focal length during zooming; and
  said fourth lens group is configured to move during zooming to compensate for aberrations caused by moving said second and third lens groups.

28. A projection lens system according to claim 24, further comprising a stop positioned substantially between the third and fourth lens groups, said stop having a stop size configured to move change during zooming in order to maintain a constant lens system F/#.

29. A projection lens system with a projection side and an object side comprising:
  a first lens group positioned adjacent to the projection side, comprising, sequentially from the projection side, a plano-convex lens that is convex on one side, a first negative refractive lens that is convex on the projection side, a second negative refractive lens that is convex on the projection side, a positive refractive lens that is concave on the projection side, and a plano-concave lens that is flat on the projection side; and
  a second lens group positioned on the object side of said first lens group, comprising, sequentially from the projection side, a plano-convex lens that is flat on the projection side, and a positive meniscus lens that is convex on the projection side.

30. A projection lens system according to claim 29, further comprising:

a third lens group comprising, sequentially from the projection side, a positive meniscus lens that is concave on the projection side, and a piano convex lens that is convex on the projection side;

a fourth lens group comprising, sequentially from the projection side, a negative meniscus lens that is convex on the projection side, a double concave negative lens forming a doublet with a positive convex lens that is convex on the projection side, and a piano convex lens that is flat on the projection side; and a fifth lens group positioned on the object side of the fourth lens group and comprising a positive convex refractive lens.

31. An image display system comprising:

a projection lens system with a projection side and an object side comprising:
  a first lens group positioned adjacent to the projection side, having negative power, and including at least one lens;
  a second lens group positioned on the object side of said first lens group and having positive power;
  a third, a fourth, and a fifth lens group positioned sequentially on the object side of the second lens group, having a combined positive power, and being configured to compensate for aberrations;
  said second and third lens groups defining a combined zooming lens group configured to move to create a zooming effect;
  said fifth lens group having positive power; and
  at least one of said lens groups including at least one lens configured to move to adjust a focus, and wherein at least one of said lens groups includes a spherical lens;

an optical object-producing device positioned on the object-side of said projection lens and configured to generate a digital optical object for display; and said projection lens system configured to project an image of said object at the projection side.

32. An image display system according to claim 31, wherein said optical object-producing device comprises an array of digital light-directing devices, and further comprising a wobulation system configured to control said array of digital light-directing devices.

* * * * *

UNITED STATES PATENT AND TRADEMARK OFFICE
CERTIFICATE OF CORRECTION

PATENT NO. : 7,054,069 B1 Page 1 of 1
APPLICATION NO. : 11/048569
DATED : May 30, 2006
INVENTOR(S) : Gupta It is certified that error appears in the above-identified patent and that said Letters Patent is hereby corrected as shown below:

In the Claims

Col. 10 (line 67), delete "piano-convex" and insert therefor --plano-convex--.

Col. 11 (line 4), delete "piano-concave" and insert therefor --plano-concave--.

Col. 11 (line 8), delete "piano-convex" and insert therefor --plano-convex--.

Col. 11 (line 13), delete "piano-convex" and insert therefor --plano-convex--.

Col. 11 (line 31), delete "piano convex" and insert therefor --plano-convex--.

Col. 11 (line 50), delete "piano convex" and insert therefor --plano-convex--.

Col. 13 (line 3), delete "piano convex" and insert therefor --plano-convex--.

Col. 13 (line 9), delete "piano convex" and insert therefor --plano-convex--.

Signed and Sealed this

Sixth Day of March, 2007

JON W. DUDAS
*Director of the United States Patent and Trademark Office*